(12) United States Patent
Choi et al.

(10) Patent No.: US 10,285,126 B2
(45) Date of Patent: May 7, 2019

(54) ELECTRONIC DEVICE AND METHOD FOR IDENTIFYING LOCATION INFORMATION THEREOF

(71) Applicant: Samsung Electronics Co., Ltd., Gyeonggi-do (KR)

(72) Inventors: Kyonggon Choi, Gyeonggi-do (KR); Joonhwan Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/203,936

(22) Filed: Jul. 7, 2016

(65) Prior Publication Data

US 2017/0048797 A1 Feb. 16, 2017

(30) Foreign Application Priority Data

Aug. 12, 2015 (KR) ........................ 10-2015-0114113

(51) Int. Cl.
*H04W 52/02* (2009.01)
*H04W 4/02* (2018.01)
*G01S 19/13* (2010.01)

(52) U.S. Cl.
CPC ......... *H04W 52/0229* (2013.01); *G01S 19/13* (2013.01); *H04W 4/027* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
CPC ... H04W 52/0229; H04W 4/027; G01S 19/13; Y02B 60/50; Y02D 70/168; Y02D 70/26; Y02D 70/142; Y02D 70/00; Y02D 70/1262; Y02D 70/144; Y02D 70/164; Y02D 70/1242; Y02D 70/166
USPC .................................... 455/456.1–456.6, 457
See application file for complete search history.

(56) References Cited

U.S. PATENT DOCUMENTS

| | | | | |
|---|---|---|---|---|
| 6,463,296 | B1 * | 10/2002 | Esmailzadeh | H04W 52/06 455/245.1 |
| 7,277,049 | B2 * | 10/2007 | Korneluk | G01S 19/05 342/357.42 |
| 8,072,379 | B2 | 12/2011 | Gopinath | |
| 8,412,232 | B2 * | 4/2013 | Gupta | G01S 5/0252 342/450 |
| 8,483,705 | B1 * | 7/2013 | Cope | H04W 4/043 370/352 |

(Continued)

FOREIGN PATENT DOCUMENTS

KR 10-0723690 B1 5/2007

*Primary Examiner* — Mong-Thuy T Tran
(74) *Attorney, Agent, or Firm* — Cha & Reiter, LLC

(57) ABSTRACT

An electronic device and method for identifying location information are provided. The electronic device may include a receiver circuit for receiving location-related information from external devices, and a controller. The controller may implement the method, including controlling the receiver circuit to obtain the location related information from the external devices, determining the location of the electronic device based on the received location information, and deactivating the receiver circuit based on the determination result.

14 Claims, 11 Drawing Sheets

(56) References Cited

U.S. PATENT DOCUMENTS

| | | | | |
|---|---|---|---|---|
| 8,948,786 B2* | 2/2015 | Gillett | ............... | G01S 5/0072 370/328 |
| 9,635,557 B2* | 4/2017 | Grobman | ............ | H04W 12/12 |
| 2008/0012759 A1* | 1/2008 | Te-Yi | ............ | G01S 19/34 342/357.74 |
| 2009/0098880 A1* | 4/2009 | Lindquist | ............ | G01S 19/34 455/456.1 |
| 2013/0210452 A1* | 8/2013 | Sung | ............ | H04W 24/00 455/456.1 |
| 2013/0238700 A1* | 9/2013 | Papakipos | ............ | G06F 21/81 709/204 |
| 2013/0281131 A1* | 10/2013 | Hasegawa | ............ | H04W 52/0251 455/456.4 |
| 2014/0051379 A1* | 2/2014 | Ganesh | ............ | H04W 4/22 455/404.1 |
| 2014/0094195 A1* | 4/2014 | Luo | ............ | H04W 4/12 455/456.3 |
| 2014/0106778 A1* | 4/2014 | Fukuda | ............ | H04W 4/043 455/456.1 |
| 2014/0114568 A1* | 4/2014 | Park | ............ | G01S 5/0263 701/469 |
| 2014/0253371 A1* | 9/2014 | Chen | ............ | G01S 19/46 342/357.29 |
| 2014/0256346 A1* | 9/2014 | Venkatraman | ............ | H04W 4/043 455/456.1 |
| 2014/0274031 A1* | 9/2014 | Menendez | ............ | H04W 52/0209 455/426.1 |
| 2014/0357198 A1* | 12/2014 | Ye | ............ | H04W 4/02 455/73 |
| 2015/0123848 A1* | 5/2015 | Nagahara | ............ | G01S 19/34 342/357.74 |
| 2015/0346347 A1* | 12/2015 | Tsai | ............ | G01S 19/24 342/357.63 |
| 2015/0378027 A1* | 12/2015 | Shingyoji | ............ | G01S 19/24 342/357.63 |
| 2016/0088564 A1* | 3/2016 | Ahmadzadeh | ............ | H04W 52/0254 455/405 |
| 2017/0041751 A1* | 2/2017 | Hong | ............ | H04W 4/029 |

* cited by examiner

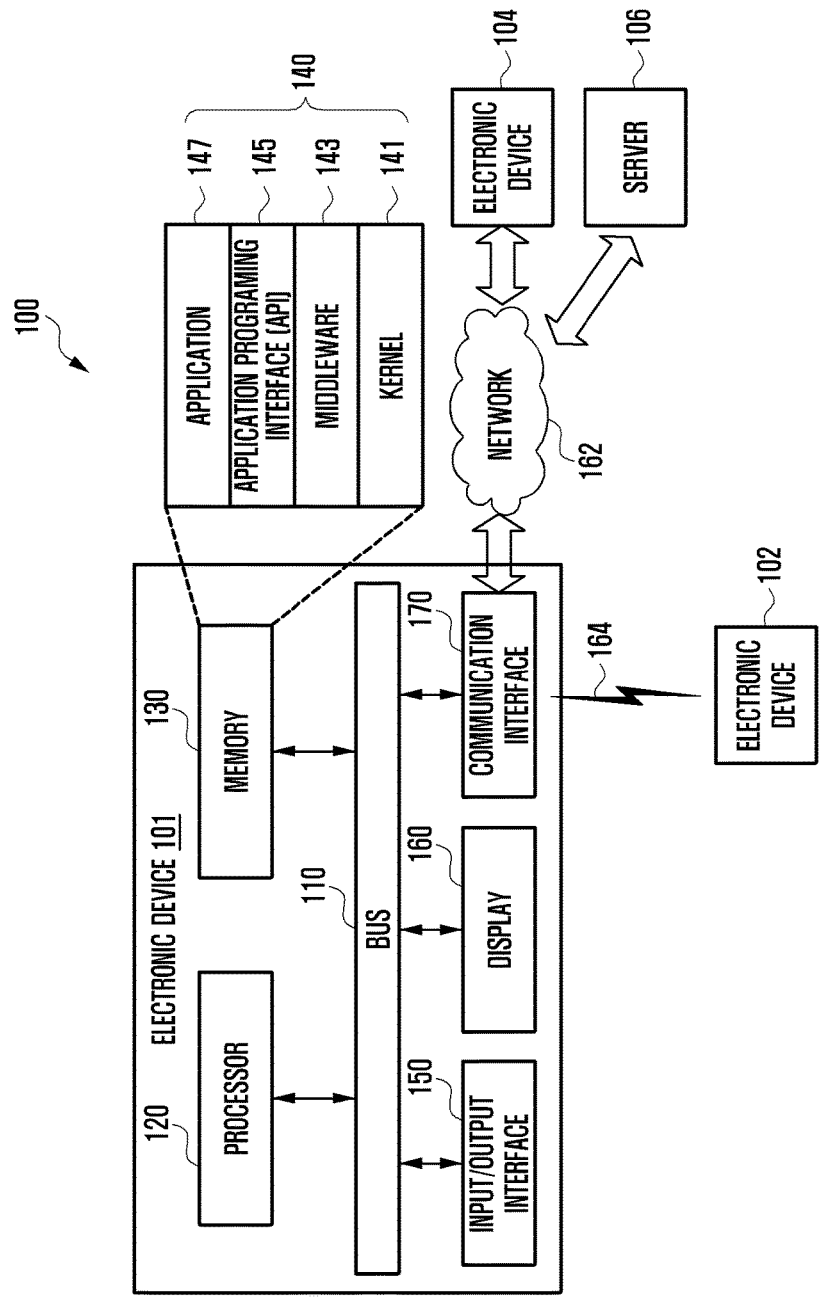

ELECTRONIC DEVICE AND METHOD FOR IDENTIFYING LOCATION INFORMATION THEREOF

CLAIM OF PRIORITY

This application claims priority under 35 U.S.C. § 119(a) to Korean Patent Application Serial No. 10-2015-0114113, which was filed in the Korean Intellectual Property Office on Aug. 12, 2015, the entire disclosure of which is incorporated herein by reference.

TECHNICAL FIELD

Various embodiments of the present disclosure relate electronic locating, and more particularly to an electronic device and method for adaptively identifying location information.

BACKGROUND

A GPS module embedded in an electronic device may receive signals from GPS satellites to determine the location of the electronic device. Although varying with arrangement of GPS satellites, such a GPS-enabled device may provide location information having a position error of several meters.

An application may receive location information from the GPS module and use the location information. The GPS module may provide the application with location information conforming to criteria (e.g. accuracy and period) set by the application.

A Global Navigation Satellite System (GNSS) module such as a GPS module may provide high precision location information, but may consume an excessive amount of energy. In particular, the usability of a small electronic device such as a wearable device may be limited due to the power consumption caused by GPS usage.

SUMMARY

An aspect of the present disclosure is to provide an electronic device and method for identifying location information thereof with low power consumption due to location identification.

In accordance with an aspect of the present disclosure, an electronic device is provided. The electronic device may include a receiver circuit to receive location related information from external devices, and a controller configured to: control the receiver circuit to obtain the location related information from the external devices, determine the location of the electronic device based on the received location related information, and deactivate the receiver circuit based on the determination result.

In accordance with another aspect of the present disclosure, there is provided a method for location identification of an electronic device. The method includes receiving location related information from external devices using a receiver circuit, determining by a controller the location of the electronic device based on the received location related information, and deactivating the receiver circuit based on the determination result.

In accordance with another aspect of the present disclosure, a computer readable storage medium is provided. The computer readable storage medium may store a program executable by a processor to cause an electronic device to obtain location related information from external devices through a receiver circuit, and deactivate the receiver circuit based on the obtained location related information.

In a feature of the present disclosure, there are provided an electronic device and method for identifying location information thereof. The method enables the electronic device to identify the location thereof with low power consumption.

BRIEF DESCRIPTION OF THE DRAWINGS

The above and other aspects and features of certain embodiments of the present disclosure will be more apparent from the following detailed description taken in conjunction with the accompanying drawings, in which:

FIG. 1 illustrates a network environment including electronic devices according to various embodiments of the present disclosure;

DETAILED DESCRIPTION

Figure 2A:
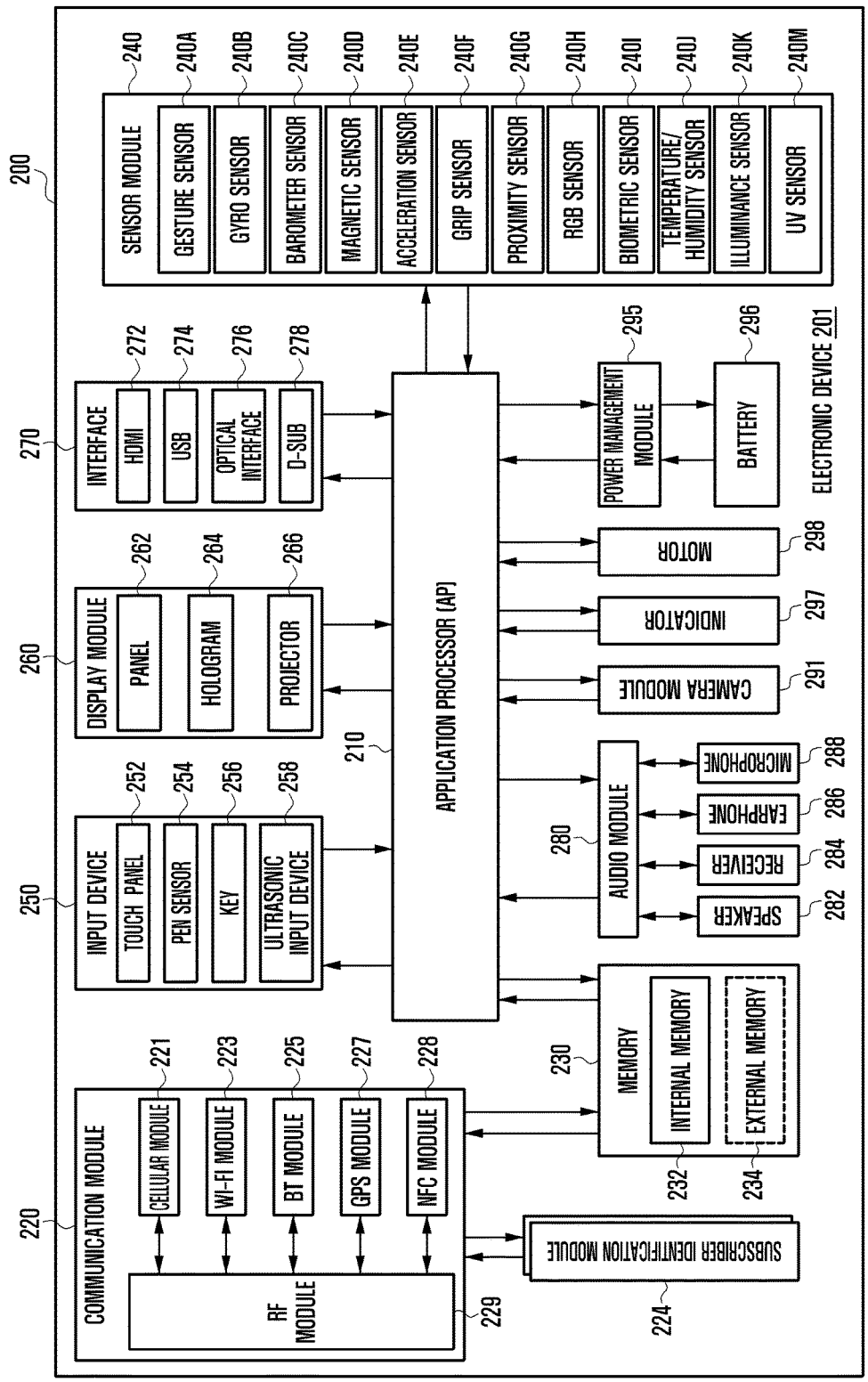
FIG. 2A is a block diagram of an electronic device according to various embodiments of the present disclosure.

In the description, the "location identification period" indicates a period for obtaining location related information, and may refer to the duration between the time the location of the electronic device 101 is identified and the next time the location thereof is identified. The location identification period may be varied on the basis of parameters set in the processor 120, the application processor 210, or the GNSS module 227, or may be fixed to a default value according to a policy of the electronic device 101.

The following description with reference to the accompanying drawings is provided to assist in a comprehensive understanding of various embodiments of the present disclosure as defined by the claims and their equivalents. It includes various specific details to assist in that understanding but these are to be regarded as mere examples. Accordingly, those of ordinary skill in the art will recognize that various changes and modifications of the embodiments described herein can be made without departing from the present disclosure. In addition, descriptions of well-known functions and implementations may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

As used herein, the singular forms "a", "an", and "the" are intended to include the plural forms, including "at least one", unless the content clearly indicates otherwise. "Or" means "and/or". As used herein, the term "and/or" includes any and all combinations of one or more of the associated listed items. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer" or "section" discussed below could be termed a second element, component, region, layer or section without departing from the teachings herein.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are examples only and not to be considered as a limitation of this disclosure. FIG. 1 is a block diagram illustrating a network environment 100 including therein an electronic device 101 in accordance with an embodiment of the present disclosure. Referring to FIG. 1, the electronic device 101 may include, but not limited to, a bus 110, a processor 120, a memory 130, an input/output interface 150, a display 160, a communication interface 170, and an application control module 140.

The bus 110 may be a circuit designed for connecting the above-discussed elements and communicating data (e.g., a control message) between such elements.

The processor 120 may receive commands from the other elements (e.g., the memory 130, the input/output interface 150, the display 160, the communication interface 170, or the application control module 140, etc.) through the bus 110, interpret the received commands, and perform the arithmetic or data processing based on the interpreted commands.

The memory 130 may store therein commands or data received from or created at the processor 120 or other elements (e.g., the input/output interface 150, the display 160, the communication interface 170, or the application control module 140, etc.). The memory 130 may include programming modules such as a kernel 141, a middleware 143, an application programming interface (API) 145, and an application 147. Each of the programming modules may be implemented in software, firmware, hardware, and any combination thereof.

The kernel 141 may control or manage system resources (e.g., the bus 110, the processor 120, or the memory 130, etc.) used for performing operations or functions of the other programming modules, e.g., the middleware 143, the API 145, or the application 147. Additionally, the kernel 141 may offer an interface that allows the middleware 143, the API 145 or the application 147 to access, control or manage individual elements of the electronic device 101.

The middleware 143 may perform intermediation by which the API 145 or the application 147 communicates with the kernel 141 to transmit or receive data. Additionally, in connection with task requests received from the applications 147, the middleware 143 may perform a control (e.g., scheduling or load balancing) for the task request by using technique such as assigning the priority for using a system resource of the electronic device 101 (e.g., the bus 110, the processor 120, or the memory 130, etc.) to at least one of the applications 147.

The API 145 which is an interface for allowing the application 147 to control a function provided by the kernel 141 or the middleware 143 may include, for example, at least one interface or function (e.g., a command) for a file control, a window control, an image processing, a text control, and the like.

According to embodiments, the application 147 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 147 may be an application associated with an exchange of information between the electronic device 101 and any external electronic device (e.g., an external electronic device 104). This type application may include a notification relay application for delivering specific information to an external electronic device, or a device management application for managing an external electronic device. For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application may receive notification information from an external electronic device (e.g., the electronic device 104) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to embodiments, the application 147 may include a specific application specified depending on attributes (e.g., a type) of an external electronic device (e.g., the electronic device 104). For example, in case an external electronic device is an MP3 player, the application 147 may include a specific application associated with a play of music. Similarly, in case an external electronic device is a portable medical device, the application 147 may include a specific application associated with a health care. In an embodiment, the application 147 may include at least one of an application assigned to the electronic device 101 or an application received from an external electronic device (e.g., the server 106 or the electronic device 104).

The input/output interface 150 may deliver commands or data, entered by a user through an input/output unit (e.g., a sensor, a keyboard, or a touch screen), to the processor 120, the memory 130, the communication interface 170, or the application control module 140 via the bus 110. For example, the input/output interface 150 may offer data about a user's touch, entered through the touch screen, to the processor 120. Also, through the input/output unit (e.g., a speaker or a display), the input/output interface 150 may output commands or data, received from the processor 120, the memory 130, the communication interface 170, or the application control module 140 via the bus 110. For example, the input/output interface 150 may output voice data, processed through the processor 120, to a user through the speaker.

The display 160 may contain LCD (liquid crystal display), LED (Light Emitting Diode), OLED (Organic Light Emitting Diode), MEMS (Microelectromechanical systems) Display, and electronic paper display. The display 160 may display thereon various kinds of information (e.g., multimedia data, text data, etc.) to a user. The display 160 may contain touch screen and, for example, the display 160 may receive touch using electronic pen or a portion of the user's body, gesture, and hovering input.

Figure 2B:
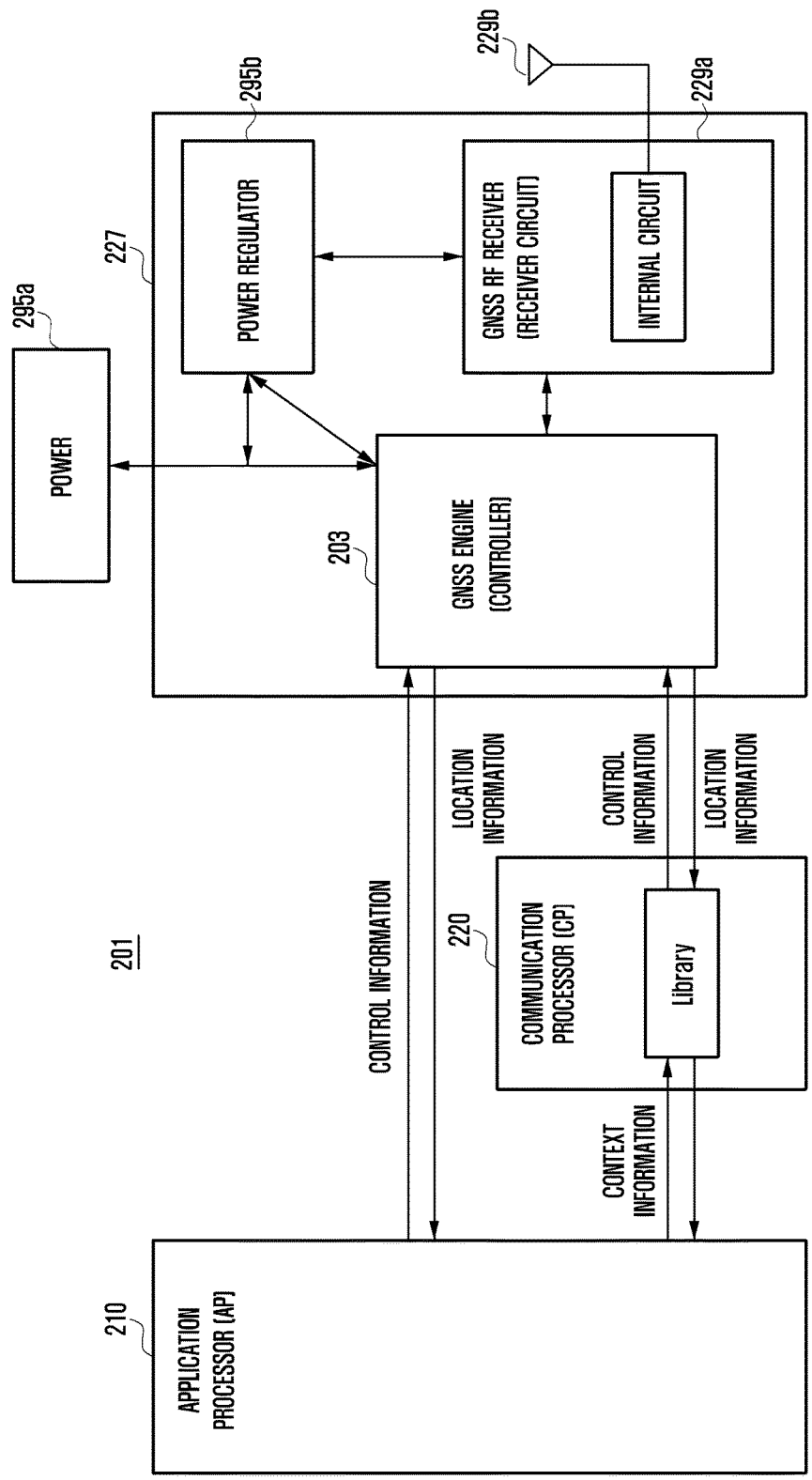
FIG. 2B is a block diagram of an electronic device according to various embodiments of the present disclosure.

In various embodiments, the display 160 may output location information determined by at least one of the processor 120, the application processor 210, and the GNSS module 227 (e.g., of FIG. 2B). The display 160 may also output information received by the electronic device 101 from one or more satellites. The display 160 may output a UI screen for setting the location identification period, generate an input signal corresponding to user input for setting the location identification period, and forward the input signal to at least one of the processor 120, the application processor 210 (e.g., of FIG. 2A), and the GNSS module 227.

The communication interface 170 may perform a communication between the electronic device 101 and any external electronic device (e.g., the electronic device 104 of the server 106). For example, the communication interface 170 may communicate with any external device by being connected with a network 162 through a wired or wireless communication. A wireless communication 164 to an electronic device 102 for example may include, but not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication may include, but not limited to, at least one of USB (Universal Serial Bus), HDMI (High Definition Multimedia Interface), RS-232 (Recommended Standard 232), or POTS (Plain Old Telephone Service).

According to an embodiment, the network 162 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 101 and any external device may be supported by at least one of the application 147, the API 145, the middleware 143, the kernel 141, or the communication interface 170.

The application control module 140 may process at least part of information obtained from the other elements (e.g., the processor 120, the memory 130, the input/output interface 150, or the communication interface 170, etc.) and then offer it to a user in various ways. For example, the application control module 140 may recognize information about access components equipped in the electronic device 101, store such information in the memory 130, and execute the application 147 on the basis of such information. A further description about the application control module 140 will be given hereinafter through FIGS. 2 to 9.

FIG. 2 is a block diagram illustrating an electronic device 201 in accordance with an embodiment of the present disclosure. The electronic device 201 may form, for example, the whole or part of the electronic device 101 shown in FIG. 1. Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 200 (e.g., the electronic device 101) through the network. According to an embodiment, the communication module 220 may include therein a cellular module 221, a WiFi module 223, a BT module 225, a GPS (or GNSS) module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224.

According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS (or GNSS) module 227 and the NFC module 228 may include a processor for processing data transmitted or received therethrough. Although FIG. 2 shows the cellular module 221, the WiFi module 223, the BT module 225, the GPS (or GNSS) module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS (or GNSS) module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

In one embodiment, the communication module 220 may be connected to the application processor (AP). At least one of the cellular module 221, Wi-Fi module 223, Bluetooth module 225, GNSS module 227, and NFC module 228 may directly send and receive a signal to and from the application processor.

In one embodiment, the GNSS module 227 may be a module that has a location identification function enabling determination of the location of the electronic device 101. Hence, The GNSS module 227 may include one or more components to carry out the location identification function in addition to the components described herein.

In one embodiment, the GNSS module 227 may include a controller for controlling components of the GNSS module 227 to carry out the GNSS related function. For example, the GNSS module 227 may include a GNSS engine (e.g. GPS engine). The GNSS module 227 may include a communication processor (CP), and the GNSS engine may be included in the communication processor. In various embodiments, the GNSS module 227 may be implemented using a GNSS chipset (e.g. GPS chipset). The GNSS module 227, GNSS engine, controller in the GNSS module 227, GNSS chipset, and communication processor may be configured as separate entities with different functions or configured as a single entity, if desired.

In various embodiments, the GNSS module 227 may receive information from one or more artificial satellites and forward the received information to the processor 120, the application processor 210, or the communication processor 220. The GNSS module 227 may directly identify the location of the electronic device 101 on the basis of the received satellite information. In this case, the GNSS module 227 may send information associated with the identified location to the processor 120, the application processor 210, or the communication processor 220.

In various embodiments, when at least a part of the GNSS module 227 (e.g. GNSS RF receiver 229A) is turned off, the electronic device 101 may identify the location by use of the communication module 220. When the GNSS RF receiver 229A is turned off, if there is a need to identify the location of the electronic device 101, the processor 120 may identify the location on the basis of the communication module 220 including the cellular module 221 and Wi-Fi module 223.

The SIM card 224 may be inserted into a slot formed at a certain place of the electronic device. The SIM card 224 may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

In various embodiments, the memory 130 may store at least one of programs, algorithms, routines, and instructions needed for controlling the GNSS module 227. The memory 130 may store instructions needed for carrying out the functions described herein under the control of the processor 120.

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric (e.g., barometric or barometer) sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 160) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 150 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 200. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

FIG. 2B is a block diagram of an electronic device 201 according to various embodiments of the present disclosure.

FIG. 1, FIG. 2A, and FIG. 2B may have common elements. Although not shown, the electronic device 201 of FIG. 2B may further include some elements shown in FIG. 1 or FIG. 2A, and the electronic device 201 of FIG. 2B may be an instance of the electronic device 101 of FIG. 1. In addition, the application processor 210 and the communication processor 220 shown in FIG. 2B may be an instance of the processor 120 shown in FIG. 1.

In one embodiment, the electronic device 201 may include an application processor (AP) 210, a communication processor (CP) 220, and a communication module (e.g. GNSS module 227). The GNSS module 227 may have a GNSS engine (controller) 203, a GNSS RF receiver 229A, an antenna 229B, and a power regulator 295B, and may be supplied power from a power source 295A. In various embodiments, the GNSS RF receiver 229A and the antenna 229B may be included as a part in the RF module 229, and the power source 295A and the power regulator 295B may be included in the power management module 295.

In the electronic device 201 having the above configuration, the GNSS engine 203 may obtain location information of the electronic device 201 through the GNSS RF receiver 229A (receiver circuit) and forward the location information to at least one of the application processor 210 and the communication processor 220.

In one embodiment, the application processor 210 may generate control information including the location identification period on the basis of the received location information and forward the control information to the GNSS module 227. The GNSS engine 203 may control the GNSS RF receiver 229A on the basis of the location identification period contained in the control information. Specifically, the GNSS engine 203 may control supply of power to the GNSS RF receiver 229A (receiver circuit) by regulating the power regulator 295B or switch according to the location identification period. For example, to reduce power consumption due to unnecessary location identification, the GNSS engine 203 may control the power regulator 295B or switch to cut off power to the internal circuit (ADC, LNA or the like) of the GNSS RF receiver 229A.

In one embodiment, the application processor 210 may provide the communication processor 220 with various context information (described later). For example, the application processor 210 may collect context information through the sensor module 240 and forward the collected context information to the communication processor 220. The communication processor 220 may generate control information on the basis of the received context information and the library. Here, the library may be a database or firmware that stores control information mapped with context information. The application processor 210 may also generate control information on the basis of collected context information. The communication processor 220 may collect context information through various electrically or functionally connected sensors, convert the collected context information into control information by use of the library, and send the control information to the GNSS module 227.

The GNSS module 227 having the above configuration may be realized as one chip separately from the application processor 210 and the communication processor 220 as shown in FIG. 2B. However, not limited thereto, the GNSS module 227 may also be realized as a single chip including the application processor 210 and the communication processor 220.

In one embodiment, the GNSS module 227 may remain in one of "off" (sleep) state, "on" (idle, standby) state, and "active" state. In the off (sleep) state, power to the receiver circuit (GNSS RF receiver 229A) of the GNSS module 227 is cut off while power to the other parts (e.g. resources like tasks or memory) is supplied. In the on (idle, standby) state, power to the receiver circuit (GNSS RF receiver 229A) is supplied. In the active state, power is supplied to both the receiver circuit (GNSS RF receiver 229A) and the other parts to receive location information.

Figure 3:
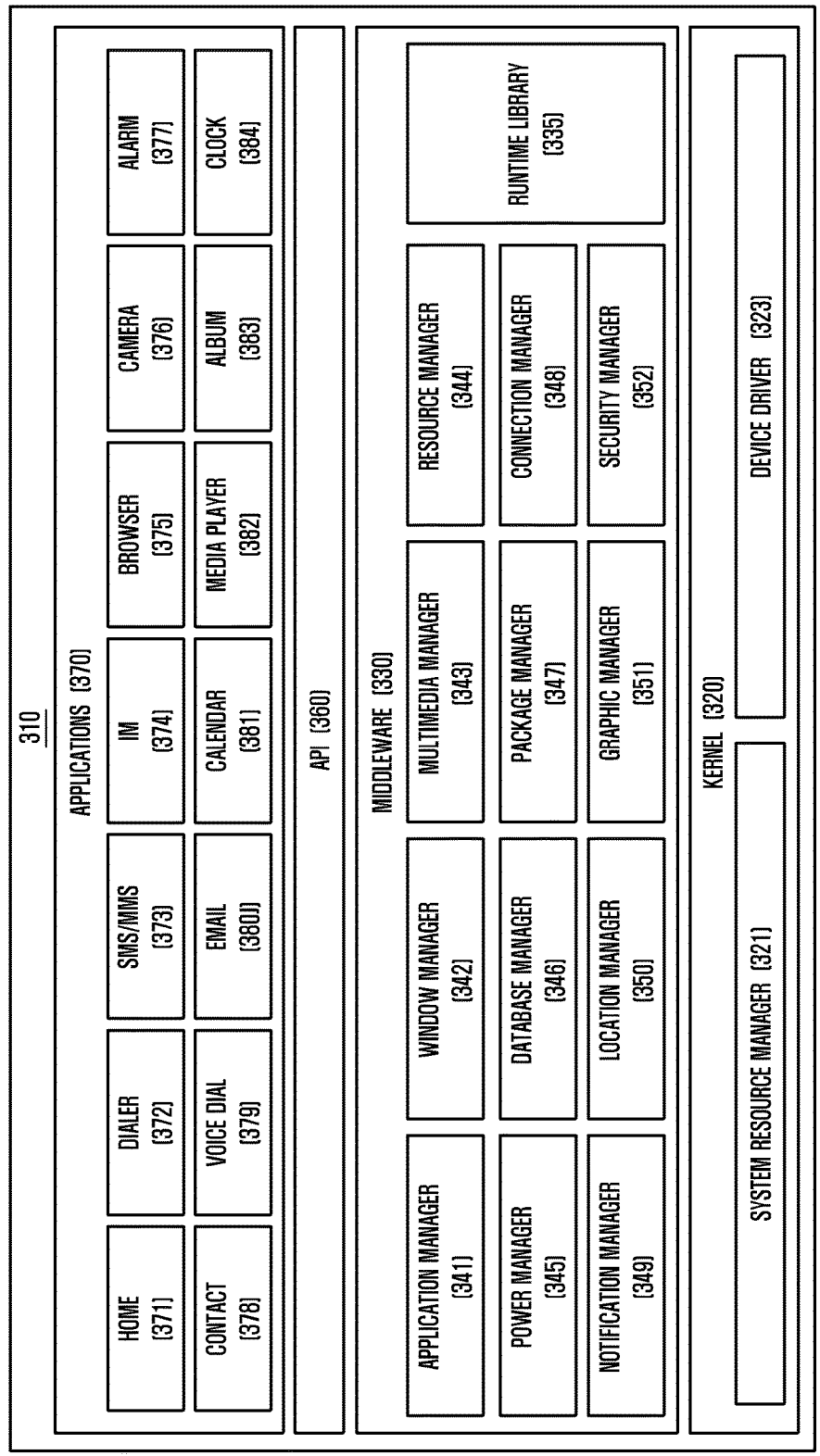
FIG. 3 is a block diagram of a programming module according to various embodiments of the present disclosure.

FIG. 3 is a block diagram illustrating a configuration of a programming module 300 according to an embodiment of the present disclosure.

The programming module 300 may be included (or stored) in the electronic device 101 (e.g., the memory 130) or may be included (or stored) in the electronic device 200 (e.g., the memory 230) illustrated in FIG. 1. At least a part of the programming module 300 may be implemented in software, firmware, hardware, or a combination of two or more thereof. The programming module 300 may be implemented in hardware (e.g., the electronic device 200), and may include an OS controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 300 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more application processors 210), the one or more processors may perform functions corresponding to the instructions. The non-transitory computer-readable storage medium may be, for example, the memory 230. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

In one embodiment of the present disclosure, the electronic device may include a receiver circuit to receive location related information from external devices, and a controller to control the receiver circuit. The controller may obtain location related information from the external devices by use of the receiver circuit, determine the location of the electronic device on the basis of the location related information, and turn off the receiver circuit on the basis of the determination result. In various embodiments, the external devices may be various types of artificial satellites, such as GPS satellites, GLONASS satellites, Galileo satellites, and Compass satellites. The external devices may also be indoor positioning system (IPS) devices.

In one embodiment, the electronic device may further include at least one processor. The controller may be configured to obtain control information generated by the processor, identify the period for obtaining location related information on the basis of the control information, and generate a signal to turn on or off power supply to the receiver circuit on the basis of the period.

In one embodiment, the controller may be configured to determine the location of the electronic device by use of the location related information while the receiver circuit is turned on.

In one embodiment, the electronic device may further include a power control circuit to control power supply to the receiver circuit. For example, the power control circuit may include a power regulator 295B and a switch.

In another embodiment, the electronic device may further include at least one processor. The controller may be configured to receive control information for receiver circuit control from the processor. In various embodiments, the receiver circuit and the controller may be implemented as a single chip communication module, separately from the processor.

In one embodiment, the processor may be configured to receive context information of the electronic device through at least one sensor functionally connected to the electronic device, and generate at least a portion of the control information on the basis of the context information.

In one embodiment, the context information may include information on the movement speed of the electronic device. The processor may be configured to update the period for the receiver circuit to obtain location related information according to the movement speed, and send the updated period as a portion of the control information to the controller.

In one embodiment, the context information may include information on signal strengths for location related information. The processor may be configured to update the period for the receiver circuit to obtain location related information on the basis of the signal strengths, and send the updated period as a portion of the control information to the controller.

In one embodiment, the context information may include information on the movement speed of the electronic device, information on user activities of the electronic device, information on applications or functions using location related information, information on signal strengths for location related information, information on states of the battery of the electronic device, and any combination thereof.

Figure 4:
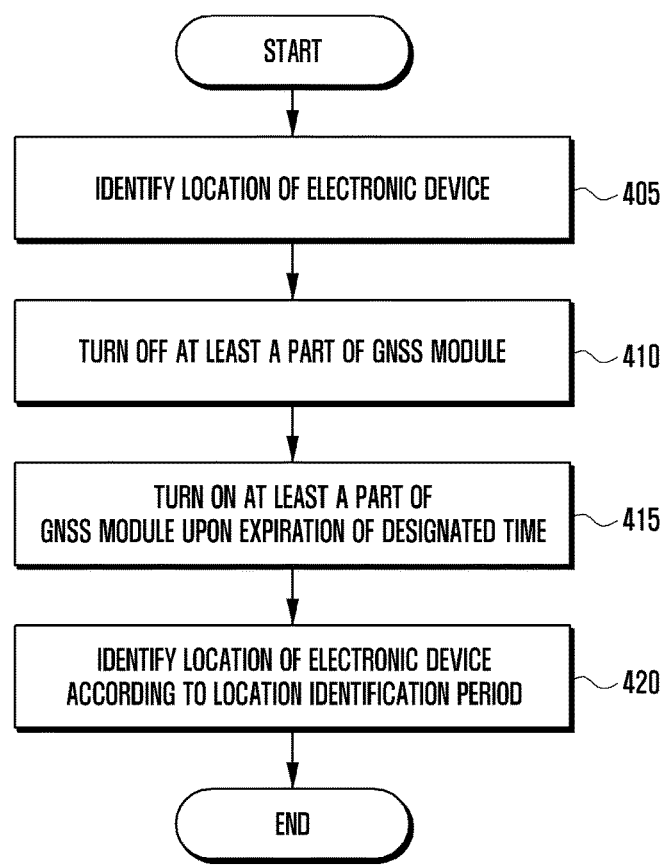
FIG. 4 is a flowchart of a procedure for the electronic device to identify the location by controlling the GNSS module based on the location identification period according to various embodiments of the present disclosure.

FIG. 4 is a flowchart of a procedure for the electronic device 101 to identify the location by controlling the GNSS module 227 based on the location identification period according to various embodiments of the present disclosure.

Referring to FIG. 4, at operation 405, the electronic device 101 identifies the location of an electronic device. Specifically, the GNSS module 227 or processor 120 may analyze signals received from one or more artificial satellites to identify the location of the electronic device 101. For example, the GNSS module 227 may receive satellite information from multiple satellites and forward the received satellite information to the processor 120, and the processor 120 may determine the location of the electronic device 101 based on the satellite information including such as propagation time (with consideration of the speed of light) as included in the satellite information.

In various embodiments, the artificial satellites may include at least one of Global Positioning System (GPS) satellites, Global Navigation Satellite System (GLONASS) satellites, Galileo satellites, and Compass satellites. The satellite information may include at least one of satellite distance data, satellite almanac data, satellite ephemeris data, and correction factors.

At operation 410, the electronic device 101 turns off the receiver circuit (e.g., GNSS RF receiver 229A) of the GNSS module 227. For example, the processor 120 may send the GNSS module 227 control information indicating turning off of the receiver circuit immediately after location identification, and the GNSS module 227 may turn off the receiver circuit (GNSS RF receiver 229A) according to the control information.

At operation 415, the electronic device 101 turns on the receiver circuit (GNSS RF receiver 229A) after expiration of a designated time. For example, the controller 203 of the GNSS module 227 may turn on the receiver circuit (GNSS RF receiver 229A) after expiration of the designated time indicated by the control information.

In various embodiments, the designated time for turning on may be determined on the basis of control information including the location identification period and a policy for the GNSS module 227. Specifically, when the receiver circuit of the GNSS module 227 is turned off after location identification of the electronic device 101, the controller 203 of the GNSS module 227 may identify the next location identification time on the basis of the location identification period. The controller 203 may turn on the receiver circuit of the GNSS module 227 upon expiration the designated time determined in consideration of a minimum preparation time prior to the next location identification time. For example, if the location identification period is set to 2 seconds and the minimum preparation time for location identification is set to 1 second, the designated time may be identified as being set to 1 second. Then, the controller 203 may turn on the receiver circuit of the GNSS module 227 upon expiration of 1 second after the receiver circuit of the GNSS module 227 is turned off. The designated time for turning on may be computationally or experimentally determined.

At operation 420, the controller 203 of the GNSS module 227 identifies the location of the electronic device 101 according to the location identification period. For example, when the location identification period is fixed to a default value, the controller 203 of the GNSS module 227 may newly identify the location of the electronic device 101 on a fixed period basis. When the location identification period is variable, the controller 203 of the GNSS module 227 may newly identify the location of the electronic device 101 on a variable period basis. In this case, the turn-on time for the receiver circuit of the GNSS module 227 has to be changed with respect to the changed location identification period.

As described in connection with FIG. 4, the controller 203 of the GNSS module 227 turns off the receiver circuit thereof in consideration of location identification of the electronic device 101, reducing unnecessary power consumption.

Figure 5:
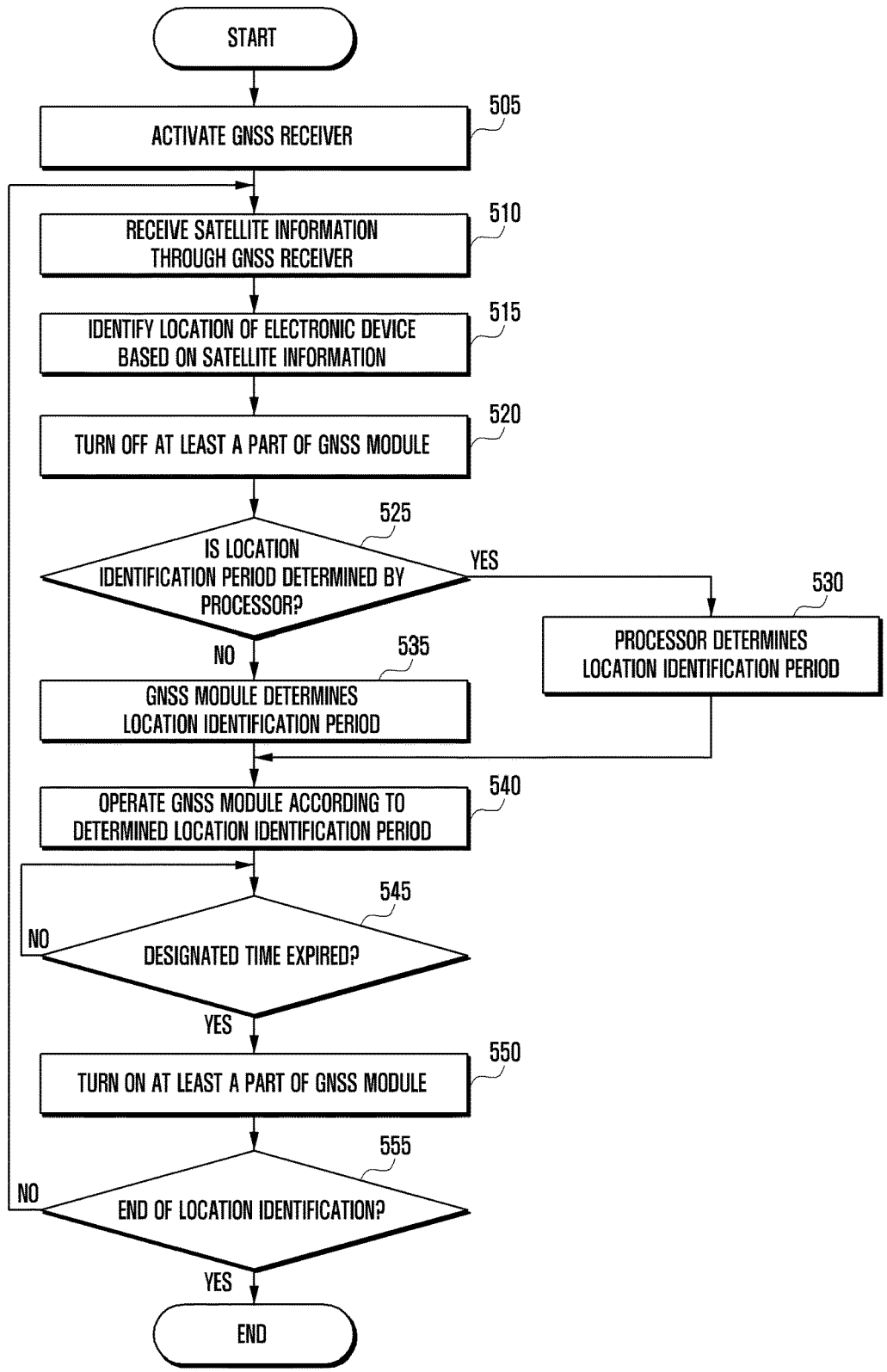
FIG. 5 is a flowchart of a detailed procedure for the electronic device to identify its location by controlling the GNSS module based on the location identification period according to various embodiments of the present disclosure.

FIG. 5 is a flowchart of a detailed procedure for the electronic device 101 to identify its location by controlling the GNSS module 227 based on the location identification period according to various embodiments of the present disclosure.

Referring to FIG. 5, at operation 505, the electronic device 101 activates the GNSS module 227. For example, when a request for location information is received from a server or external device associated with an executing (e.g., running) application, the processor 120 may send control information indicating activation to the GNSS module 227. As described before, while in the active state, the GNSS module 227 may operate components utilized for identifying the location of the electronic device 101.

At operation 510, the electronic device 101 receives satellite information through the GNSS module 227. For example, the processor 120 may receive satellite information from one or more artificial satellites through the GNSS module 227.

At operation 515, the electronic device 101 identifies a present location using the received satellite information. For example, the processor 120 may determine the location of the electronic device 101 by using the satellite information received through the GNSS module 227.

The processor 120 is described as determining the location of the electronic device 101 at operations 510 and 515. However, the present disclosure is not limited thereto. For example, the controller 203 of the GNSS module 227 may determine the location of the electronic device 101 on the basis of received satellite information and forward the determined location information to the processor 120.

At operation 520, the electronic device 101 turns off the receiver circuit of the GNSS module 227. For example, in response to receiving the location identification, the processor 120 may send control information indicating deactivation to the GNSS module 227. In one embodiment, the electronic device 101 may not perform operations associated with location identification while the receiver circuit of the GNSS module 227 is deactivated.

Alternatively, in another embodiment, while the receiver circuit of the GNSS module 227 is deactivated, the electronic device 101 may further identify the location thereof by use of at least one of the sensor module 240, cellular module 221, and Wi-Fi module 223. For example, when the receiver circuit of the GNSS module 227 is turned off, the electronic device 101 may set the location determined through the GNSS module 227 as a reference location, and determine the relative location with respect to the reference location by use of various sensors, including for example the gyro sensor 240b. For determining this relative location, the various sensors including the gyro sensor 240b may produce information regarding the direction or speed of the electronic device 101.

At operation 525, the electronic device 101 checks whether the processor 120 is configured to determine the location identification period. In various embodiments, the location identification period may be determined by one of the processor 120 and the GNSS module 227.

When the processor 120 is configured to determine the location identification period, at operation 530, the processor 120 determines the location identification period. The processor 120 may determine the location identification period on the basis of context information.

In one embodiment, the processor 120 may determine the location identification period based on contextual information such as satellite information. For example, when the satellite information indicates that the satellite signal strength is higher than a preset threshold, the processor 120 may decrease the location identification period because a strong satellite signal facilitates faster location identification. When the satellite information indicates that the satellite signal strength is lower than or equal to the preset threshold, the processor 120 may increase the location identification period to compensate for the weaker satellite signal. That is, when the current context is not good enough for location identification, the electronic device 101 or the user thereof may lengthen the location identification period by some amount. Thereby, the frequency of performing location identification is reduced, decreasing unnecessary power consumption.

The satellite information may further include a dilution of precision (DOP) value indicating satellite arrangement as a satellite state indicator. The processor 120 may determine the location identification period in consideration of such satellite state information.

In one embodiment, the processor 120 may adjust the location identification period on the basis of context information such as state information of the electronic device 101 determined based on the satellite information. For example, when the satellite information indicates that the movement speed (average velocity) of the electronic device 101 is higher than or equal to a preset threshold, the processor 120 may shorten the current location identification period. That is, when the electronic device 101 is being moved rapidly by the user or vehicle, the processor 120 may shorten the current location identification period for rapid location update. When the satellite information indicates that the movement speed (average velocity) of the electronic device 101 is lower than the preset threshold (e.g. the user is not moving), the processor 120 may lengthen the current location identification period.

In one embodiment, the processor 120 may adjust the location identification period on the basis of context information such as situation information. For example, the processor 120 may adjust the location identification period on the basis of information regarding charging states of the battery 296, user settings for location identification, applications associated with location identification, functions associated with location identification, and user activities.

For example, when the remaining power of the battery 296 is less than or equal to a preset threshold, the processor 120 may lengthen the location identification period. When the user reconfigures the existing settings to reduce power consumption, the processor 120 may lengthen the current location identification period to reduce the frequency of location identification. When an application utilizing location identification is running in the background, the processor 120 may lengthen the location identification period. When the electronic device 101 is configured to identify the location thereof by use of other components such as the sensor module 240 and Wi-Fi module 223, the processor 120 may lengthen the location identification period. In addition, the processor 120 may monitor the motion or speed of the user carrying the electronic device 101 through the sensor module 240 and determine (or adjust) the location identification period on the basis of sensed user activity information.

The electronic device 101 may adjust the turn-off time of the receiver circuit of the GNSS module 227 on the basis of the location identification period that is adjusted adaptively or dynamically according to various situations described above. Hence, it is possible to reduce power consumption due to activation of the GNSS module 227. In addition, the processor 120 may generate control information including the location identification period and send the control information to the GNSS module 227, and the controller 203 of the GNSS module 227 may adjust the turn-off time of the receiver circuit in consideration of the location identification period contained in the control information.

When the processor 120 is not configured to determine the location identification period, at operation 535, the GNSS module 227 determines the location identification period. Here, the controller 203 (GNSS engine) of the GNSS module 227 may perform the functions executed by the processor 120, as described at operation 530. In this case, the application processor 210 may provide the GNSS module 227 with state information and context information of the electronic device 101 determined based on satellite information. Then, the GNSS module 227 may determine the location identification period on the basis of state information and context information of the electronic device 101 (provided by the application processor 210) and satellite information (received directly from satellites).

At operation 540, the electronic device 101 operates the GNSS module 227 according to the determined location identification period. For example, the processor 120 or the GNSS module 227 may determine the turn-off time and turn-on time of the receiver circuit of the GNSS module 227 on the basis of the location identification period. The processor 120 or the GNSS module 227 may also determine the preparation time for turning on the receiver circuit with respect to the location identification period.

At operation 545, the electronic device 101 determines whether a designated time has expired. If the designated time has not expired, the electronic device 101 may wait for expiration of the time. During the designated time, the electronic device 101 may not perform a function associated with location identification. Alternatively, during the designated time, the electronic device 101 may further identify the location thereof by use of components other than the GNSS module 227 (e.g. sensor module 240, communication module 220, cellular module 221, and Wi-Fi module 223). Here, additional location identification may be performed by the processor 120.

If the designated time has expired, at operation 550, the electronic device 101 turns on the receiver circuit of the GNSS module 227. For example, the controller 203 of the GNSS module 227 may turn on the receiver circuit. Upon turning on of the receiver circuit, the GNSS module 227 may prepare for location identification of the electronic device 101. For example, the GNSS module 227 may activate those components of the electronic device 101 needed for location identification.

In various embodiments, upon turning on of the receiver circuit, the GNSS module 227 may receive satellite information from specific artificial satellites by use of the previous location information of the electronic device 101.

At operation 555, the electronic device 101 checks whether a request for terminating location identification is issued. If a request for terminating location identification is not issued, the procedure returns to operation 510, at which the electronic device 101 receives satellite information through the GNSS module 227. If a request for terminating location identification is issued, the procedure ends.

According to various embodiments of the present disclosure, the method of location identification for an electronic device may include: receiving location related information from external devices by use of a receiver circuit; determining the location of the electronic device on the basis of the location related information; and turning off the receiver circuit on the basis of the determination result.

In one embodiment, the electronic device may further include at least one processor. The method may further include: obtaining control information generated by the processor; identifying the period for obtaining location related information on the basis of the control information; and generating a signal to turn on or off power supply to the receiver circuit on the basis of the period.

Determining the location of the electronic device may include determining the location of the electronic device by use of the location related information while the receiver circuit is turned on.

In one embodiment, the electronic device may further include at least one processor. The method may further include receiving control information for receiver circuit control from the processor.

The method may further include: receiving context information of the electronic device through at least one sensor functionally connected to the electronic device; and generating at least a portion of the control information on the basis of the context information.

In one embodiment, the context information may include information on the movement speed of the electronic device. The method may further include: updating the period for the receiver circuit to obtain location related information according to the movement speed; and sending the updated period as a portion of the control information to the controller.

In one embodiment, the context information may include information on signal strengths for location related information. The method may further include: updating the period for the receiver circuit to obtain location related information on the basis of the signal strengths; and sending the updated period as a portion of the control information to the controller.

In one embodiment, the context information may include information on the movement speed of the electronic device, information on user activities of the electronic device, information on applications or functions using location related information, information on signal strengths for location related information, information on states of the battery of the electronic device, and any combination thereof.

Figure 6A:
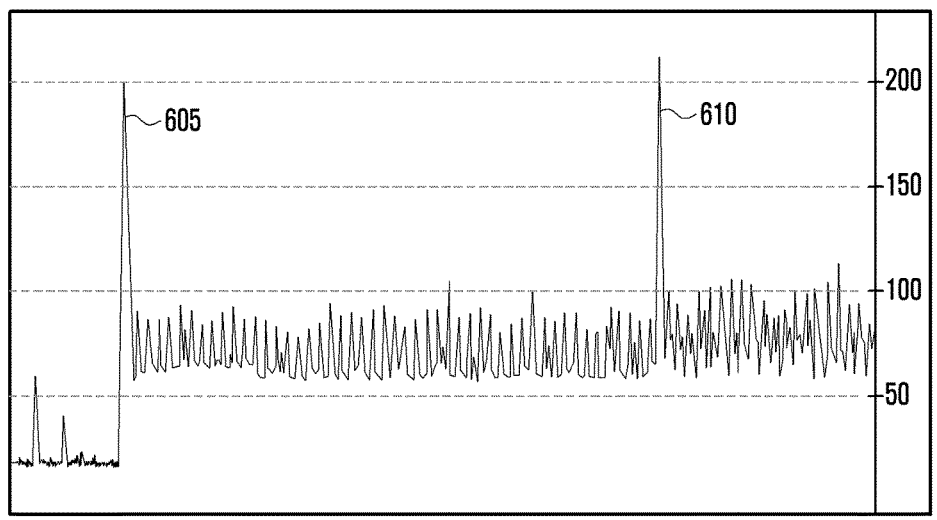
FIG. 6A and FIG. 6B are graphs illustrating changes in current consumption due to location identification in an electronic device according to the related art.
Figure 6B:
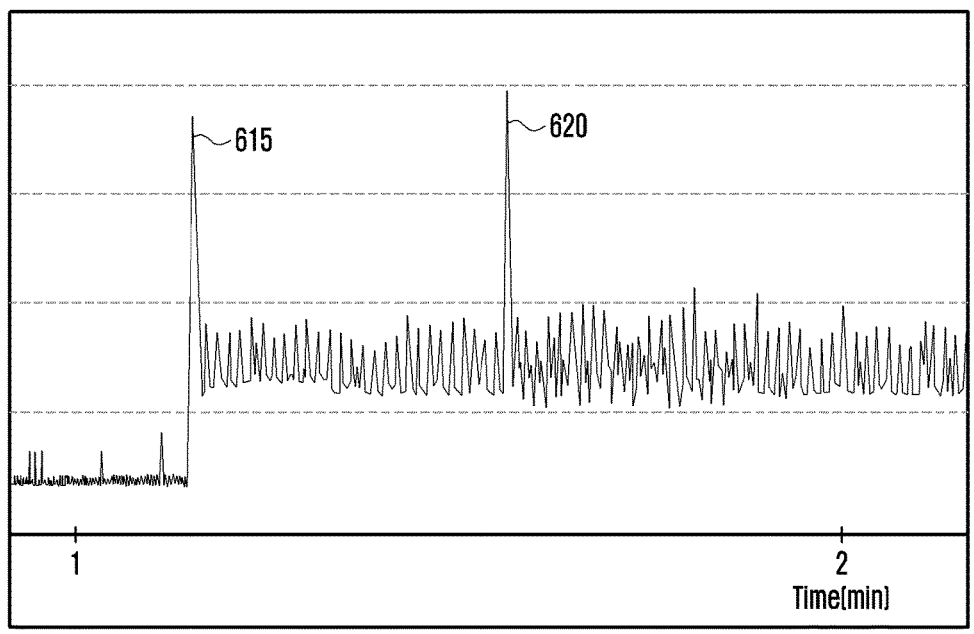

FIGS. 6A and 6B are graphs illustrating changes in current consumption due to location identification in an electronic device according to the related art. Here, for a related-art electronic device, the location identification period is set to 1 second in FIG. 6A, and is set to 2 seconds in FIG. 6B.

Referring to FIG. 6A, the current rises sharply at a time 605 when the GNSS module 227 is turned on and then reaches its peak ranging between 50 mA and 100 mA per second owing to reception of location related information, until time 610 in which the location of the electronic device 101 is identified. Referring to FIG. 6B, the current rises sharply at a time 615 when the GNSS module 227 is turned on and then reaches its peak ranging between the specified values once every two seconds owing to reception of location related information until time 620 in which the location of the electronic device 101 is identified. As described above, in the related-art electronic device, as the GPS receiver circuit is continuously turned on, it is difficult to effectively control power consumption by changing the location identification period. In other words, in the related-art electronic device, changing the location identification period does not directly give rise to reduction of current consumption as the GPS receiver circuit continuously operates.

Figure 7A:
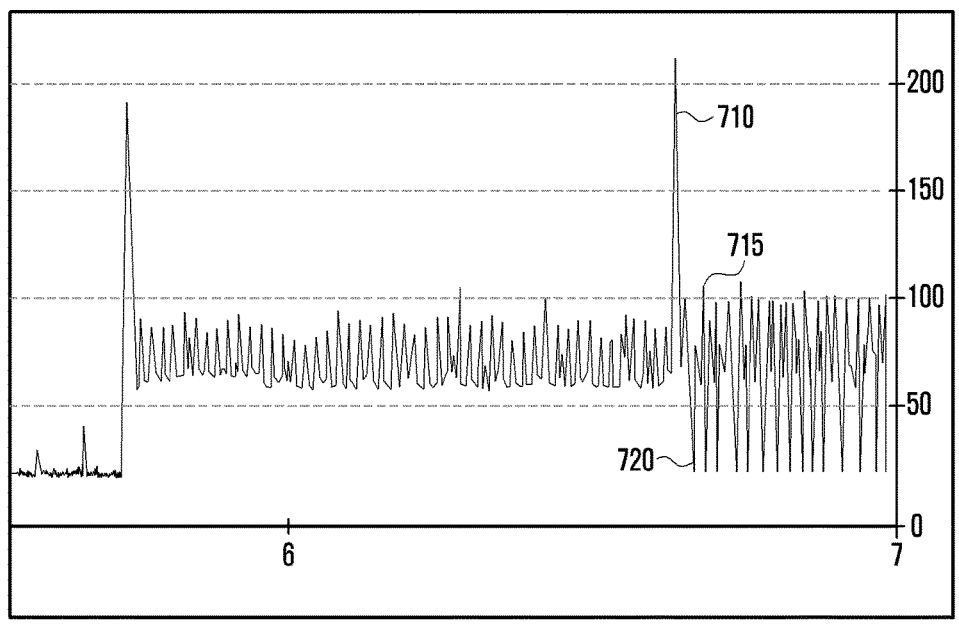
FIG. 7A and FIG. 7B are graphs illustrating changes in current consumption due to location identification in an electronic device according to various embodiments of the present disclosure.
Figure 7B:
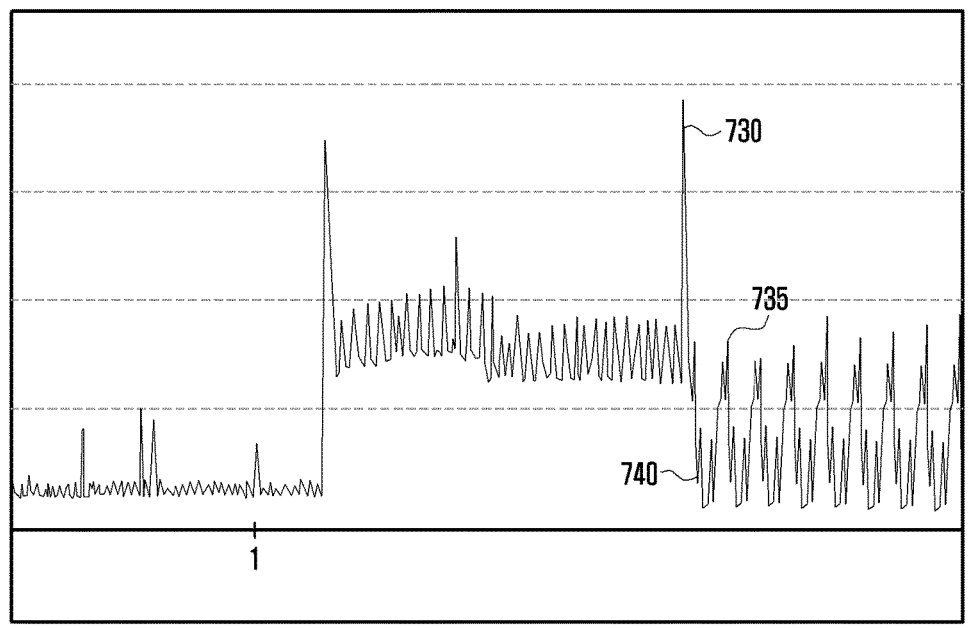

FIGS. 7A and 7B are graphs illustrating changes in current consumption due to location identification in the electronic device 101 according to various embodiments of the present disclosure. Here, for the electronic device 101, the location identification period is set to 1 second in FIG. 7A, and is set to 2 seconds in FIG. 7B.

Referring to FIG. 7A, it can be seen that the current varies widely after a time 710 when the location of the electronic device 101 is identified. Specifically, the current drops rapidly at time 720 when the receiver circuit of the GNSS module 227 is turned off after the location of the electronic device 101 is identified. Thereafter, the current rises again at a time 715 when the receiver circuit of the GNSS module 227 is turned on according to the location identification period.

Referring to FIG. 7B, similarly to the case of FIG. 7A, it can be seen that the current varies widely after time 730 when the location of the electronic device 101 is identified. Here, it can be seen that the receiver circuit of the GNSS module 227 is turned off at time 740 and is turned on at time 735. As the location identification period of FIG. 7B is longer than that of FIG. 7A, the duration when the GNSS module 227 is turned off is longer in FIG. 7B than in FIG. 7A.

As shown in FIGS. 7A and 7B, the electronic device 101 of the present disclosure may turn off the receiver circuit of the GNSS module 227 along with location identification and adjust the turn-off time of the receiver circuit by adaptively changing the location identification period. Hence, the electronic device 101 may reduce power consumption more effectively in comparison with a related-art electronic device.

Figure 8:
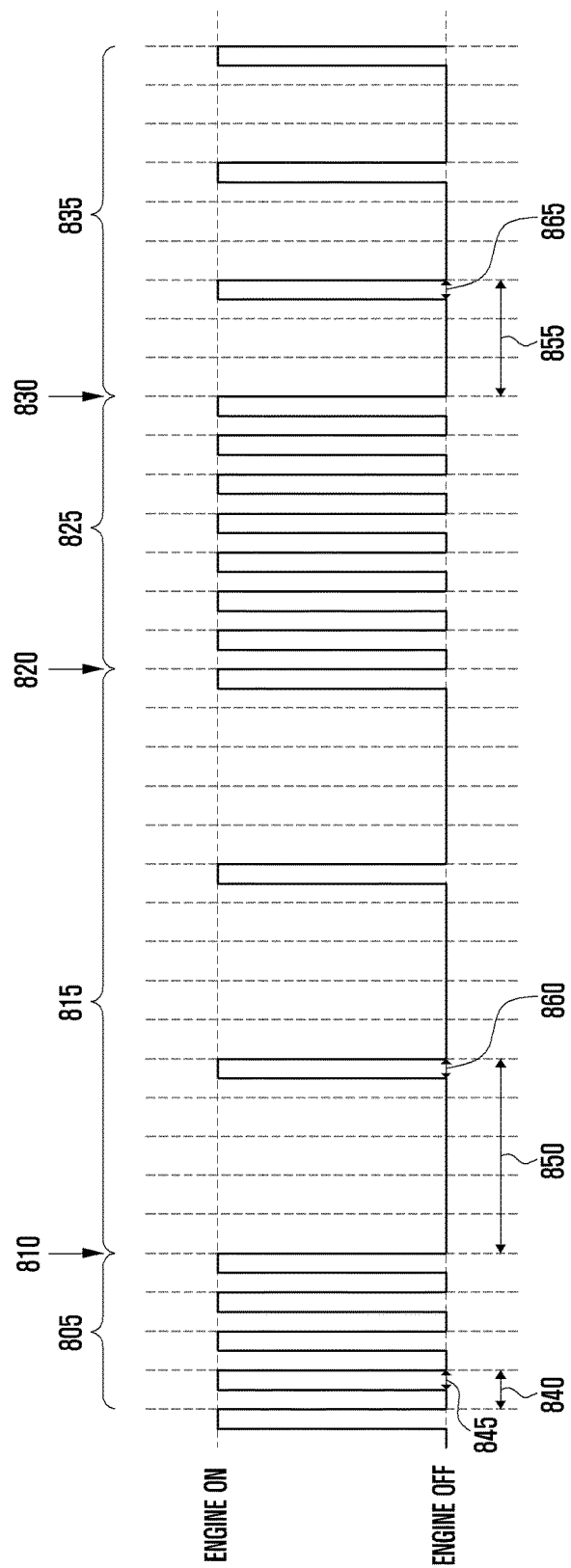
FIG. 8 illustrates GNSS module operation by the electronic device through adaptive adjustment of the location identification period according to various embodiments of the present disclosure.

FIG. 8 illustrates GNSS module operation by the electronic device 101 through adaptive adjustment of the location identification period according to various embodiments of the present disclosure. FIG. 8 shows on and off states of the receiver circuit of the GNSS module 227 with time.

In time duration 805, the user carrying the electronic device 101 may be travelling. The electronic device 101 may operate the GNSS module 227 according to a default location identification period 840 in the time duration 805. Here, it may be beneficial for the electronic device 101 to have a preparation time 845 for performing location identification. During the preparation time 845, the GNSS module 227 may receive satellite information from one or more satellites and perform a preparation operation for location identification (e.g. signal exchange or computation for location identification). In this case, the designated time for turning on of the receiver circuit of the GNSS module 227 may be given by the default location identification period 840 minus the preparation time 845. In the time duration 805, the electronic device 101 may operate the GNSS module 227 based on the default location identification period 840, the designated time, and the preparation time 845.

At a time 810, the user carrying the electronic device 101 may stop travelling. In a time duration 815, the user carrying the electronic device 101 may be not in motion. Here, because the user is not travelling, the location of the electronic device 101 does not change significantly. In this case, as there is no need for frequent location identification, the electronic device 101 may change the current location identification period 840 to a new location identification period 850. As shown in FIG. 8, the new location identification period 850 is longer than the previous location identification period 840. As the preparation time for the GNSS module 227 may be fixed, the preparation time 860 associated with the new location identification period 850 may be the same as the preparation time 845 associated with the previous location identification period 840. Here, the designated time for turning on of the receiver circuit of the GNSS module 227 may be given by the new location identification period 850 minus the preparation time 860.

At a time 820, the user carrying the electronic device 101 may begin to travel again. In time duration 825, the user carrying the electronic device 101 may be travelling. If conditions such as movement speed in the time duration 825 are very similar to those in the time duration 805, the electronic device 101 may operate the GNSS module 227 on the basis of the location identification period, designated time, and preparation time identical to those in the time duration 805.

At a time 830, the remaining power of the battery 296 in the electronic device 101 carried by the user in motion may fall below a preset threshold. In time duration 835, the user carrying the electronic device 101 may be travelling while the remaining battery power is less than the preset threshold. In the case of battery power shortage, to prevent unnecessary power consumption, the electronic device 101 may change the current location identification period to a new location identification period 855. As shown in FIG. 8, the new location identification period 855 is longer than that in the time duration 825. As described above, the preparation time 865 associated with the new location identification period 855 may be the same as the preparation time 845 or 860 associated with the previous location identification period. Here, the designated time for turning on of the receiver circuit of the GNSS module 227 may be given by the new location identification period 855 minus the preparation time 865.

In FIG. 8, the location identification period is depicted as being changed immediately at the time 810, 820 or 830. However, the present disclosure is not limited thereto. For example, when a state change occurs in the user or electronic device 101 at the time 810, 820 or 830, as it takes some time for the electronic device 101 to analyze the state change, the location identification period can be changed thereafter.

As described above, the electronic device 101 may turn off the receiver circuit of the GNSS module 227 in response to receiving the location identification and adjust the deactivation time thereof by adaptively changing the location identification period according to various conditions. Consequently, it is possible for the electronic device 101 to reduce unnecessary power consumption due to location identification.

According to an embodiment of the present disclosure, there is provided a computer readable storage medium storing a program that is configured to cause an electronic device to obtain location related information from external devices through a receiver circuit and to turn off the receiver circuit on the basis of the obtained location related information.

The program may further cause the electronic device to determine the location thereof on the basis of the location related information and to turn off the receiver circuit according to the determination result.

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While this disclosure has been particularly shown and described with reference to an example embodiment thereof, it will be understood by those skilled in the art that various changes in form and details may be made therein without departing from this disclosure as defined by the appended claims.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device comprising:
    a receiver circuit to receive signals from external devices, the received signals including location related information;
    a communication module;
    a controller configured to:
        control the receiver circuit to obtain the location related information from the external devices,
        determine a first location of the electronic device based on the received location related information,
        identify a strength of the received signals,
        determine a length of a first time period for obtaining the location related information based on the identified strength of the received signals, and
        control the receiver circuit based on the first time period,
    wherein the controller is further configured to update the location of the electronic device by use of the communication module while the receiver circuit is deactivated; and
    at least one processor configured to:
        receive context information of the electronic device through at least one sensor operatively coupled to the electronic device, the context information includes a velocity of the electronic device,
        update the first time period according to the velocity, and
        include the updated first time period in a portion of control information for controlling the receiver circuit, wherein the control information further includes information to deactivate and reactivate the receiver circuit based on the first time period.

2. The electronic device of claim 1, wherein the controller further configured to:
    receive the control information generated by the processor,
    identify a second time period for obtaining the location related information based on the control information, and
    generate a signal activating or deactivating a supply of power to the receiver circuit based on the identified second time period.

3. The electronic device of claim 1, wherein the controller is configured to determine the first location of the electronic device using the location related information while the receiver circuit is activated.

4. The electronic device of claim 1, further comprising a power control circuit configured to control power supply to the receiver circuit.

5. The electronic device of claim 1, wherein the controller is further configured to receive the control information from the at least one processor for controlling the receiver circuit.

6. The electronic device of claim 5, further comprising a communication module functionally separate from the at least one processor, the communication module including the receiver circuit and the controller.

7. The electronic device of claim 1, wherein the context information further comprises at least one of user activities of the electronic device, applications or functions using the location related information of the electronic device, and a battery state.

8. A method in an electronic device, comprising:
    receiving signals from external devices using a receiver circuit, the received signals including location related information;
    determining by a controller a first location of the electronic device based on the received location related information;
    identifying a strength of the received signals;
    determining a length of a first time period for obtaining the location related information based on the identified strength of the received signals;
    controlling the receiver circuit based on the first time period;
    updating the location of the electronic device by use of a communication module while the receiver circuit is deactivated;
    receiving context information of the electronic device through at least one sensor operatively coupled to the electronic device, the context information includes a velocity of the electronic device,
    updating the first time period according to the velocity; and
    including the updated first time period in a portion of control information for controlling the receiver circuit, wherein the control information further includes information to deactivate and reactivate the receiver circuit based on the first time period.

9. The method of claim 8, further comprising:
obtaining the control information generated by a processor of the electronic device;
identifying a second time period for obtaining the location related information based on the control information; and
generating a signal for activating or deactivating supply of power to the receiver circuit based on the identified second time period.

10. The method of claim 8, wherein the first location of the electronic device is determined using the location related information while the receiver circuit is activated.

11. The method of claim 8, further comprising receiving the control information for controlling the receiver circuit from a processor of the electronic device.

12. The method of claim 8, wherein the context information further comprises at least one of information on user activities of the electronic device, information on applications or functions of the electronic device that use the received location related information, and a battery state of the electronic device.

13. A non-transitory computer readable storage medium storing a program, wherein the program is executable by a processor to cause an electronic device to:
obtain signals from external devices through a receiver circuit, the obtained signals including location related information;
identify a strength of the obtained signals;
determine a length of a time period for obtaining the location related information based on the identified strength of the obtained signals;
control the receiver circuit based on the time period;
update the location of the electronic device by use of a communication module while the receiver circuit is deactivated;
receive context information of the electronic device through at least one sensor operatively coupled to the electronic device, the context information includes a velocity of the electronic device,
update the time period according to the velocity; and
include the updated time period in a portion of control information for controlling the receiver circuit, wherein the control information further includes information to deactivate and reactivate the receiver circuit based on the first time period.

14. The non-transitory computer readable storage medium of claim 13, wherein the program is further executable by the processor to cause the electronic device to:
determine a first location of the electronic device based on the obtained location related information and deactivate the receiver circuit based on the determination result.

\* \* \* \* \*